W. A. DE-LONG, Jr.
REST FOR BOOKS AND OTHER READING MATERIAL.
APPLICATION FILED MAR. 19, 1919.
1,320,322.  Patented Oct. 28, 1919.
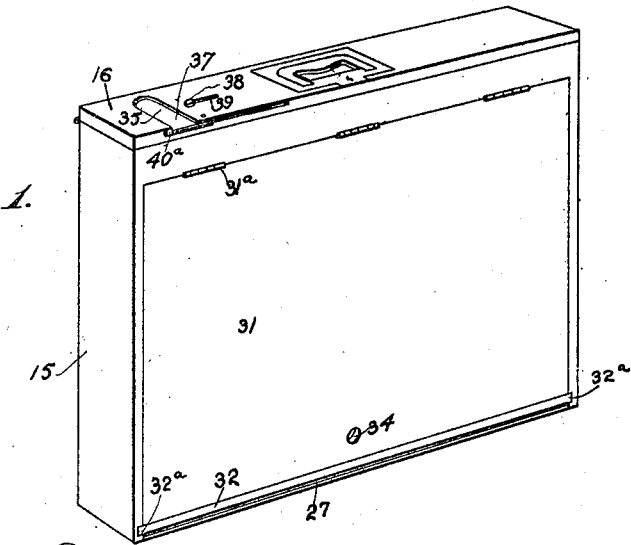
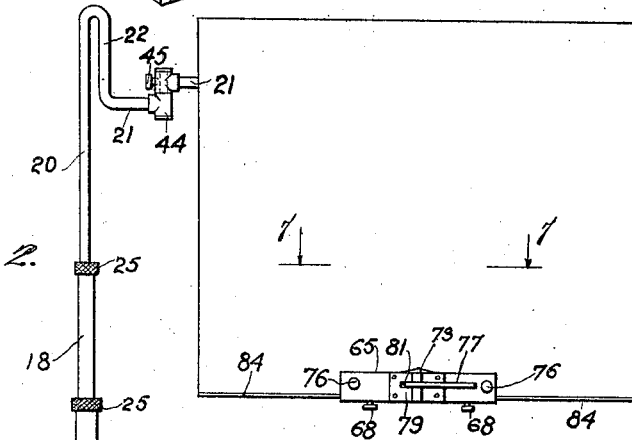
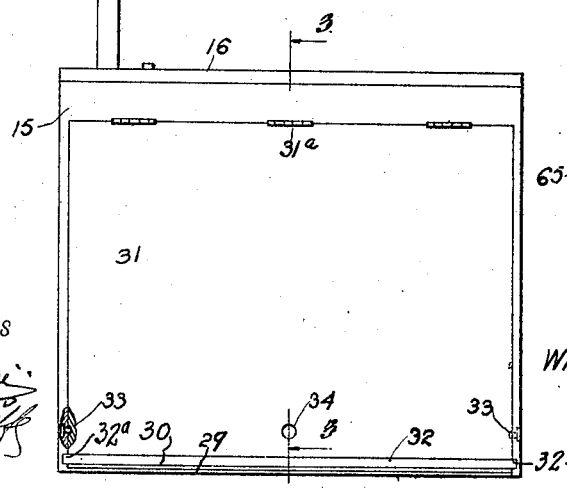

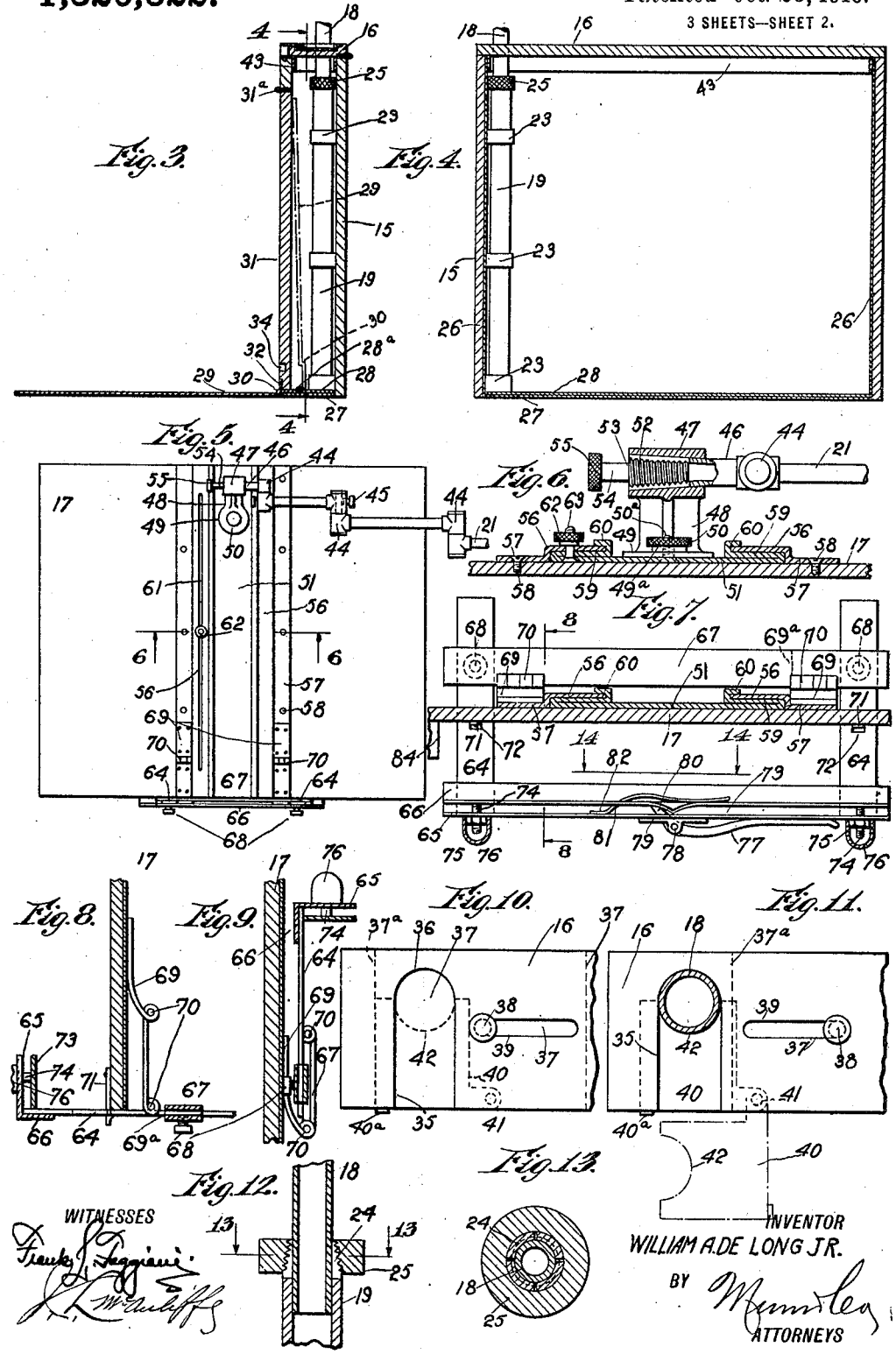

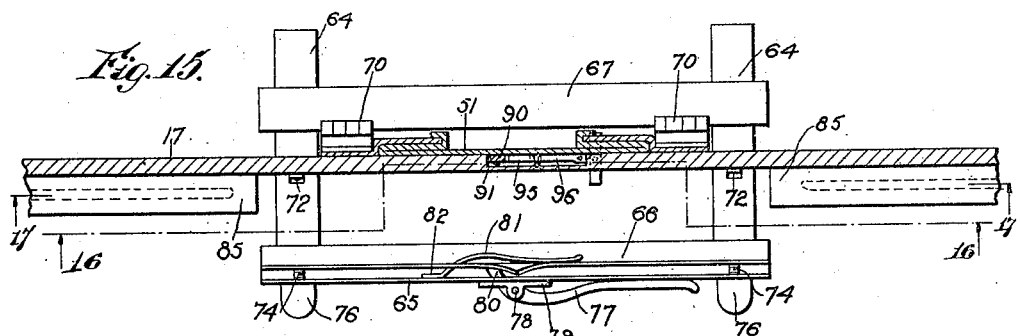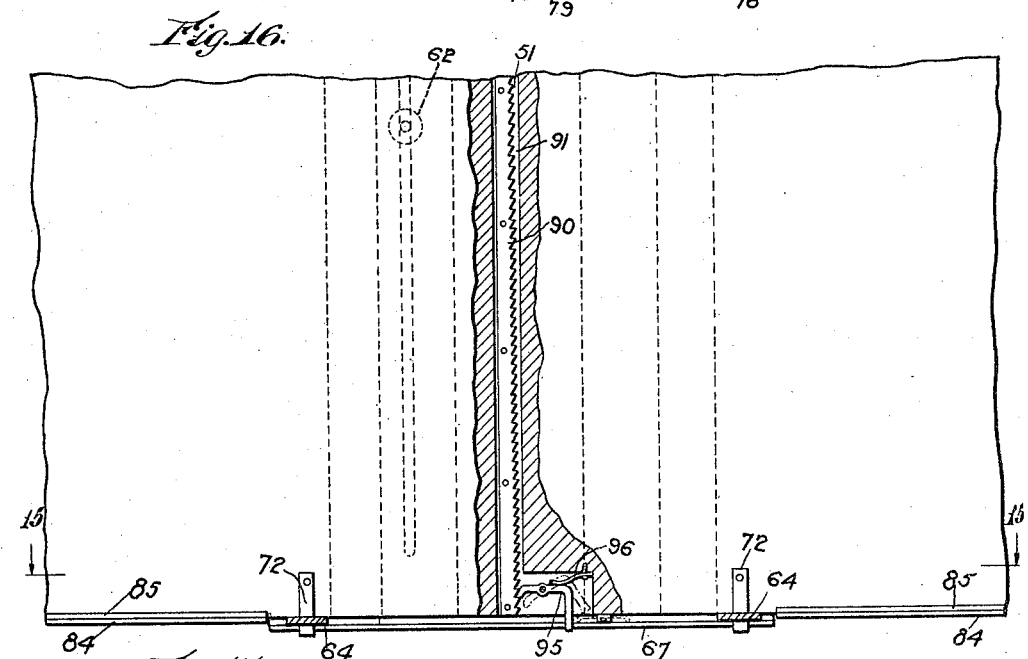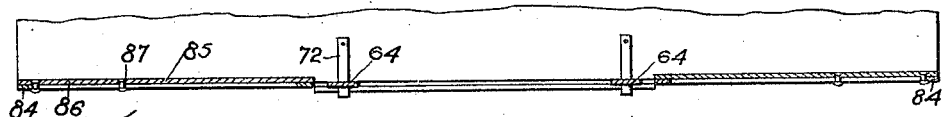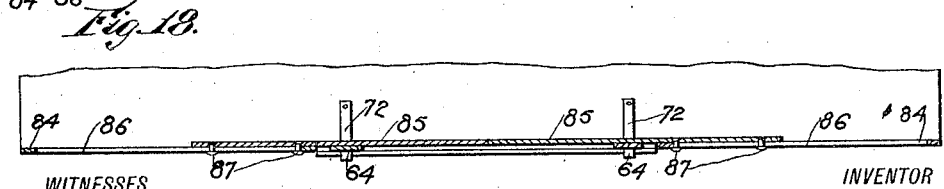

UNITED STATES PATENT OFFICE.

WILLIAM A. DE LONG, JR., OF PLAINFIELD, NEW JERSEY.

REST FOR BOOKS AND OTHER READING MATERIAL.

1,320,322.     Specification of Letters Patent.     Patented Oct. 28, 1919.

Application filed March 19, 1919. Serial No. 283,522.

*To all whom it may concern:*

Be it known that I, WILLIAM A. DE LONG, Jr., a citizen of the United States, and a resident of Plainfield, in the county of Union and State of New Jersey, have invented a new and Improved Rest for Books and other Reading Material, of which the following is a description.

My invention relates to a stand affording a rest for books, magazines, or other reading matter, and more particularly relates to a device to be employed by a person seated in a chair.

The general object of my invention is to provide a rest of the indicated character improved in various particulars, whereby certain important advantages and results are obtained among which are the following: The book rest proper is carried by a stand made in telescopic sections adapted when in the telescoped or knocked-down form to be accommodated with the book rest proper within a casing forming the base of the device; said base is provided with a foldable anchoring device receivable, when the structure is not in use, within the base or casing of the structure and arranged, so that when swung to a lowered position onto the floor, it constitutes means whereby the base is anchored by a chair resting thereon, so that the occupant of the chair may utilize the device for the support of a book or other reading matter; the book rest proper is provided with novel means to retain the book or other matter and has adjustable features to suit the particular character of a book or the like; various adjustments are provided for the rest proper to dispose the same at the proper distance from the person seated in the chair anchoring the structure as well as means to vary the angular position of the book rest.

The manner of attaining the above objects and results as well as others, will appear from the specific description following.

Reference is to be had to the accompanying drawings forming a part of this specification, it being understood that the drawings are merely illustrative of one example of the invention.

Figure 1 is a perspective view of my improved structure in the knocked-down form suitable for being carried after the manner of a suit case;

Fig. 2 is a front elevation of the structure set up for use in the form of a stand;

Fig. 3 is a transverse vertical section through the casing or hollow base of the structure as indicated by the line 3—3, Fig. 2;

Fig. 4 is a longitudinal vertical section of said casing or base as indicated by the line 4—4, Fig. 3;

Fig. 5 is a rear view of the holder or rest proper with a portion of the articulated arm that carries the same;

Fig. 6 is a horizontal section on the line 6—6, Fig. 5;

Fig. 7 is a fragmentary section on an enlarged scale as indicated by the line 7—7, Fig. 2;

Fig. 8 is a cross section on the line 8—8, Fig. 7;

Fig. 9 is a section similar to Fig. 8 but with certain parts folded into the inoperative position;

Fig. 10 is a fragmentary plan view of a portion of a top or cover of the base or casing, the view being given to show certain details hereinafter to be referred to;

Fig. 11 is a view similar to Fig. 10 but showing in section the telescoping standard and indicating the features in different positions from those shown in Fig. 10, as will appear more clearly hereinafter;

Fig. 12 is a detail in vertical section of a portion of the telescoping standard;

Fig. 13 is a horizontal section on the line 13—13, Fig. 12;

Fig. 14 is a detail view as indicated by the line 14—14 in Fig. 7;

Fig. 15 is a horizontal section indicated by the line 15—15, Fig. 16;

Fig. 16 is a longitudinal vertical section on the irregular line 16—16, Fig. 15;

Fig. 17 is a vertical section in a plane corresponding with the line 17—17, Fig. 15;

Fig. 18 is a view corresponding with Fig. 17 but showing certain parts in different adjustments as hereinafter particularly explained.

In constructing a practical embodiment of my invention in accordance with the illustrated example, a base structure 15 is provided in the form of a casing adapted to receive the book holder and its telescoping standard as well as the anchoring device as hereinafter referred to, the open top of the casing being provided with a hinged cover or closure 16.

The holder or rest proper indicated generally by the numeral 17 is supported on a standard 18 formed of telescoping sections. The lower section 19 is fixed in the casing 15, while the upper section 20 carries a lateral arm 21 articulated as hereinafter further referred to, said arm being connected with the upper end of the section 20 by a return bend 22 in the example shown which facilitates the assemblage of the parts in the case 15 in knocked-down form. The fixed section 19 of the standard is held by straps 23. To bind the sections of the standard 18 against movement in the raised or lowered position, compression nuts 25 are provided, fitting over the tapered threaded and slitted upper ends 24 of the respective sections as shown in Figs. 12 and 13.

The sides of the casing 15 are in practice formed of sheet metal having a wood facing, the sheet metal 26 being continued from side to side to form the bottom 27 and said bottom is folded on itself to provide a hinge leaf 28, and a leaf 29 is hinged thereto, as at 28ª, (Fig. 3), so that said leaf 29 may be swung downward into the plane of the bottom 27 and lying in front of the casing 15 or folded within the casing as indicated by the dotted lines, Fig. 3. To cause the leaf 29 to lie in the plane of the bottom 27, said leaf is offset as at 30. The front 31 of the casing is hinged at its upper edge as at 31ª. When the leaf 29 is swung downwardly onto the floor, it constitutes a means whereby to anchor the stand by placing the legs or rocker of a chair on said leaf. A lock bar and wear plate 32 is provided on the lower edge of the door 31 and locks into a metallic frame of the casing 15 at each side as at 32ª, in order to engage the leaf 29 at the offset portion 30 and throw all strain on the metallic frame of the structure as well as to give a finish to the bottom of the door. In practice any approved catches or fasteners indicated conventionally at 33 may be provided to latch the door in closed position and the leaf 29 and the combined lock bar and wear plate 32 in open position. Also, said door may have a depression or hole 34 to constitute a finger-hold.

The cover 16 is formed with a slot 35 extending from an edge thereof, the rounded inner end 36 of which accommodates the standard 18 when the same is projected above the top of the base or casing 15 as best seen in Figs. 10 and 11. In order to close the slot 35 when the standard is lowered, a slide 37 is provided, the length of which is indicated by the dotted lines 37ª, Figs. 10 and 11. Said slide has a button 38 operating in a slot 39 in the cover 16. Also, on the cover is a swinging closure 40 pivoted as at 41 and formed with a cut-out edge 42 to conform to the standard 18 when the latter is in the raised position as will be clear from Fig. 11. The casing 15 may be reinforced by a metal strip 43 extending at all sides thereof at the top as indicated in Figs. 3 and 4.

Various adjustments of the holder or rest proper 17 are possible by reason of the following instrumentalities: The arm 21 of standard section 20 is formed in sections connected by articulated joints 44, one or more of which may have set screws 45 as indicated in Fig. 5, engaged on broad surfaces in order to provide for adjustment of the engagement whereby the rest proper 17 may be swung under the pull or push of the reader when in reading position and remain in the adjusted position or positively locked in any adjusted position as desired. The outermost joint 44 connects with a terminal section 46 of said arm 21 to which the holder 17 is secured as follows: Said section 46 is received in a tubular bearing 47 on a standard 48, the base 49 of which is secured to a vertical slide 51 on the holder 17, there being a knurled clamp nut 50 or the like turning on a stud 50ª on the slide 51 and being adapted to bind against a boss 49ª on said base 49, Fig. 6. The section 46 within the sleeve or bearing 47 is split and threaded as at 52 to receive a tapered threaded plug 53 on a stem 54 having a knurled head 55 or the like; the arrangement serves to form a broad adjustable friction bearing of sufficient strength to hold the rest 17 and its load at any angle and at the same time permit itself adjustment from the reader's position by exerting greater pressure than that represented by the combined weight of the rest 17 and its load. The slide 51 fits in guides 56 which are offset from guide strips 57 secured by screws 58 or the like on the holder 17 to thus permit relative sliding movement of said holder; and preferably, said slide 51 is folded on itself at the side edges as at 59 and the extreme edges turned laterally outward over the guides 56 as indicated at 60, Fig. 6, to give steadied guided movement to the slide. In order to hold the rest 17 in any vertical adjustment relatively to the slide 51 and to provide for easy sliding upward when reading from top to bottom of a long column, a clamp nut 62 of very broad frictional surface is provided, turning on an adjustable stud 63 secured to the slide 51 and extending through the vertical slot 61 in one of the guides 56, (see Fig. 5). With the described arrangement various adjustments are provided to permit the user to adjust the holder 17 at the desired distance from a chair in which the user is seated, and at any desired angle for reading with comfort. Thus, the arm section may be swung at the joints 44; the arm as a whole may be turned to swing the holder 17 through an angle about the axis of the socket 47 and arm section 46; the relative elevations of the arm 21 and holder 17 may be varied through the raising and lowering of the holder through the medium of the slide 51 and then made fast in adjusted position through the medium of the clamp nut 62; and finally, the holder 17 may be turned in its own plane with the pin 50ª, (Fig. 6), as a center.

Means is provided at the front of the holder 17 at the bottom to support a book, magazine, paper or other reading matter, the supporting means including transverse strips 64 which are swingably mounted as hereinafter explained to occupy positions projecting in front of and below the face of the holder or to swing to the rear of the holder in folded position for stowage in the casing 15, and also, when matter is being read which will of itself stay open and lie flat, in which case a clamping device would be a nuisance. At the front ends, strips 64 carry an upstanding plate 65 adapted to be disposed approximately parallel with the face of the holder 17 as in Figs. 2 and 8, or to be swung through an angle of approximately 270° to occupy a position at the back of the holder as in Fig. 9. Said front plate 65 is L-shaped, the flange or L 66 being secured to the strips 64. The rear ends of the strips 64 have sliding adjustment in keepers on a longitudinal bar 67 disposed at the back of the holder 17 and may be held in adjusted position by set screws 68 or the like, the arrangement permitting the front plate 65 to be spaced a greater or lesser distance from the face of the holder 17 as will be clearly understood from Fig. 8. The strip or bar 67 is swingably supported at the back of the holder 17, which holder is generally of metal with a wood facing. Thus, double hinges 69 are fastened at their upper ends to the back of the holder 17 and have a plurality of hinge joints 70, the lower hinge members 69ª being fastened to the bar 67 (see Fig. 8). When the strips 64 are in supporting position as in Fig. 8 they are held by any suitable latch means, there being provided vertical latches 71 in the instance shown and disposed on the face of the holder 17, the lower ends being adapted to be received in holes 72 (Fig. 7) in the strips 64. At the inner side of and approximately parallel with the front plate 65 of the support, there is a clamp plate 73 movable relatively to the plate 65 so as to be moved toward or from the face of the holder 17 for clamping a book or the like. In the example shown, said clamp plate 73 has guide studs 74 extending freely through the front plates 65 and are provided with heads 75 which may, as shown, be in the form of nuts to be adjustable on the studs. The final adjustment of the heads 75 having been effected in assembling the device, caps or housing 76 may be provided for said heads to give a finish thereto. A lever 77 is employed in connection with the clamp plate 73 and pivoted as at 78 to a bracket 79 on the front plate 65. The nose 80 of the lever extends through a hole 81, Fig. 2, in the bracket 79 and front plate 65, to bear against the plate 73 so that the lever may be swung through an angle to cause the clamp plate 73 to bind against the book or the like supported between said plate and the front of the holder 17. To bring the clamp plate 73 up close to plate 65 when lever 77 is turned to release the book, I provide a plate spring 81, Figs. 7 and 14, secured at one end as at 82 at the back of the front plate 65 and lying over a depending tongue or flange 83 on the clamp plate 73. A book, newspaper, or the like, of a width to extend a little beyond the strips 64 will have additional support at the sides on supporting elements 84 on the front of the holder 17 (Figs. 2 and 7).

In connection with the elements 84, I employ slides 85 which have a slot and pin connection with said elements 84, there being slots 86 in said elements 84 and pins 87 secured to slides 85 and movable in said slots. Thus, when the rest elements 64 and their appurtenances are swung to the back of the book rest 17 as indicated in Fig. 9, front support is provided through the medium of the elements 84 and slides 85, the slides being adapted to be adjusted toward each other to bridge the gap between the supporting strips 84.

With the described construction, the device may be quickly set up for use as in Figs. 2 and 3 or it may be readily assembled in knocked-down form to be contained within the casing 15, for which purpose the front 31 is swung open and the anchoring element 29 swung within the case after which the front 31 is closed. The supporting structure represented by the strips 64 and elements carried thereby are swung from the position of Fig. 8 to that of Fig. 9, the arm 21 is then folded at the joints 44 to bring the holder 17 into position to drop through the open top of the casing after the cover 16 is raised and the nuts 25 of the telescoping standard loosened to permit the standard sections to telescope into the socket member 19 thereof.

The character 40ª, Figs. 1, 10 and 11, indicates a finger-hold on the swinging closure element 40.

In order further to permit of the rapid and convenient raising of the rest proper 17 when reading high columns from top to bottom, the slide 51, (see Figs. 15 and 16), has a toothed rack 90, flat thereon which works up and down in the groove 91 in the back of the rest proper 17. Attached to the face of the rest proper 17 in operative position is a pawl 95 shown best in Fig. 16, which, as the said rest is pushed up by the fingers of the reader, engages said rack 90 and sustains the rest against dropping back. It is to be understood that the clamp nut 62 is set loosely when the rest 17 is being adjusted manually on the rack 90 to conform to the convenient reading of long columns, for example.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A book rest or the like including a case, a holder for books or the like, means to support said holder from said case and an anchoring element swingably mounted in said case to fold within the same or to occupy a position at the bottom of the case to lie beneath a chair, and a front on the casing adapted to be opened to permit the anchoring element to swing into and out of the casing.

2. In a device of the class described, a casing constituting a base for the structure, a telescoping standard supported on the base and adapted to be extended above the same or to be accommodated in telescoped form within the casing, a lateral articulated arm supported on said standard at its upper end, and a holder carried by said arm and adapted to support a book or the like, said casing having an open top and said holder being swingable relatively to the standard to pass into said casing through said top with the telescoping of the standard.

3. In a device of the class described, a supporting standard, a holder adapted to receive a book or the like, a lateral arm extending from said standard, a slide on which said holder is bodily vertically adjustable and means connecting said lateral arm at its outer end with said slide so that the slide and holder may together have vertical swinging adjustment on said arm.

4. In a device of the class described, a supporting standard, a holder adapted to receive a book or the like, an arm extending from said standard, a slide on which said holder is vertically adjustable bodily, and means connecting said arm at its outer end with the said slide, said last-mentioned means having a pivotal connection with said slide, whereby said slide and the holder may be turned through an angle in the general plane of the holder.

5. A device of the class described including a hollow base having an open top, an extensible standard supported in said base and adapted to be projected above the base or collapse within the latter, a holder carried by said standard adapted to be accommodated in said base when the standard is collapsed, a swingable cover for the top of said base, said cover having a transverse slot accommodating at its inner end said standard when in projected position, a swingable member mounted on the cover to be swung into or out of the slot and conforming at its inner end with the standard, and a slide on the cover to form a closure for said slot when the standard is in the collapsed position.

6. In a device of the class described, a book rest proper, a slide on which said rest is supported, means to support said slide, parallel guides on the rest and forming channels, members on the slide and slidingly movable in said channels for the vertical adjustment of the rest, that guide member on the rest at one side, being slotted vertically, a threaded stud on the adjacent sliding member of the slide, and a clamp nut on said stud adapted when tightened to bear against the slotted guide member and press the same into clamping engagement with said sliding member to positively hold the rest against movement in either direction on the slide and a rack and pawl on the slide and book rest respectively for the ready optional vertical adjustment of the rest when said nut is loosened.

7. A structure constituting a rest for books and other reading matter, the same including a support, and means at the lower end of the support adapted to have a chair or equivalent anchoring medium imposed thereon for anchoring the structure, said last-mentioned means being swingable on the support to a horizontal anchoring position or away from said anchoring position.

8. A structure constituting a rest for books and other reading matter, the same including a support, and means at the lower end of the support adapted to have a chair or equivalent anchoring medium imposed thereon for anchoring the structure, said last-mentioned means being mounted to move relatively to said support to an outer position for receiving the anchoring medium or inwardly from the anchoring position.

WILLIAM A. DE LONG, Jr.